United States Patent
Shudo et al.

(12) 
(10) Patent No.: US 6,472,078 B1
(45) Date of Patent: Oct. 29, 2002

(54) LIQUID ADDITION-CURABLE SILICONE RUBBER COMPOSITION FOR FIXING ROLLER PURPOSE, AND FIXING ROLLER

(75) Inventors: Shigeki Shudo, Annaka (JP); Shigeru Ubukata, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/580,528

(22) Filed: May 30, 2000

(30) Foreign Application Priority Data

May 28, 1999 (JP) ............................. 11-149753

(51) Int. Cl.$^7$ ................................. B32B 9/04
(52) U.S. Cl. ..................... 428/447; 528/15; 528/31; 528/32; 524/588
(58) Field of Search .................... 528/15, 31, 32; 428/447; 524/588

(56) References Cited

U.S. PATENT DOCUMENTS

| | | | |
|---|---|---|---|
| 5,519,082 A | * 5/1996 | Yoshino | ............... 524/493 |
| 5,521,245 A | * 5/1996 | Hirabayashi et al. | ....... 524/493 |
| 5,770,298 A | 6/1998 | Nakamura et al. | .......... 428/195 |
| 5,854,344 A | * 12/1998 | Shiono et al. | .............. 524/862 |
| 6,090,887 A | * 7/2000 | Nakamura et al. | .......... 524/862 |

FOREIGN PATENT DOCUMENTS

| | | |
|---|---|---|
| EP | 0 763 568 A2 | 3/1997 |
| JP | 11-45022 | 2/1999 |
| JP | 11-194643 | 7/1999 |

* cited by examiner

Primary Examiner—Margaret G. Moore
(74) Attorney, Agent, or Firm—Pillsbury Winthrop LLP

(57) ABSTRACT

A fixing roller purpose liquid addition-curable silicone rubber composition including (A) 100 parts by weight of an organopolysiloxane having in one molecule at least two alkenyl groups bonded to silicon atoms; (B) from 1 part by weight to 30 parts by weight of an organopolysiloxane having hydroxyl groups at both terminals of the molecular chain; (C) an organohydrogenpolysiloxane having in one molecule at least two hydrogen atoms bonded to silicon atoms; and (D) a platinum group metal compound in a catalytically effective quantity. The SiH groups in the component (C) is present in an amount of from 0.4 to 5.0 equivalent weight per one alkenyl group in the component (A). This composition is a substantially non-foamable and addition-curable liquid silicone rubber composition, which is therefore suitable for the fixing roller purpose. The composition has a good moldability to a mandrel and enables production of a fixing roller with a silicone rubber layer having superior toner releasability and mechanical strength.

16 Claims, No Drawings

LIQUID ADDITION-CURABLE SILICONE RUBBER COMPOSITION FOR FIXING ROLLER PURPOSE, AND FIXING ROLLER

BACKGROUND OF THE INVENTION

1. Field of the Invention

This invention relates to a silicone rubber composition used for fixing rollers used in copying machines, laser beam printers, fax machines and so forth. More particularly, it relates to a liquid addition-curable silicone rubber composition used for a fixing roller having a silicone rubber surface layer, and a fixing roller produced using such a composition.

2. Description of the Prior Art

As fixing rollers used in copying machines, laser beam printers, fax machines and the like, conventionally used are those comprising a mandrel and a silicone rubber surface layer provided on the former's outer periphery (called silicone rubber rollers). The reason why silicone rubber is used in the surface layer is that the silicone rubber has physical and mechanical properties such as toner releasability, heat resistance, compression set and so forth which are superior to those of other rubber materials.

In recent years, however, as fixed images are required to be improved in sharpness and machinery has been made high-speed, toner releasability and mechanical strength are sought to be more improved. Also, some addition-curable silicone rubber compositions used to form silicone rubber layers are foamable. Such foamable compositions may damage the sharpness and so forth of fixed images, and hence it has been sought to provide a non-foamable addition-curable silicone rubber composition.

SUMMARY OF THE INVENTION

Accordingly, an object of the present invention is to provide a substantially non-foamable, fixing roller purpose liquid addition-curable silicone rubber composition which has a good moldability and enables production of a fixing roller having a silicone rubber layer having superior toner releasability and mechanical strength; and a fixing roller obtained using such a composition.

To achieve the above object, the present invention provides a substantially non-foamable, fixing roller purpose liquid addition-curable silicone rubber composition comprising;

(A) 100 parts by weight of an organopolysiloxane having in one molecule at least two alkenyl groups bonded to silicon atoms;

(B) from 1 part by weight to 30 parts by weight of an organopolysiloxane having hydroxyl groups at both terminals of the molecular chain;

(C) an organohydrogenpolysiloxane having in one molecule at least two hydrogen atoms bonded to silicon atoms (SiH groups); the SiH groups in the component (C) being present in an amount of from 0.4 to 5.0 equivalent weight (i.e., from 0.4 to 5.0 groups) per one alkenyl group in the component (A); and (D) a platinum group metal compound in a catalytically effective quantity.

The present invention also provides a fixing roller comprising a mandrel and provided on the outer periphery thereof a silicone rubber layer comprising a cured product of the above composition.

DETAILED DESCRIPTION OF THE PREFERRED EMBODIMENTS

The liquid addition-curable silicone rubber composition of the present invention is substantially non-foamable and is used for fixing rollers, which is constituted basically of an organopolysiloxane having in one molecule at least two alkenyl groups bonded to silicon atoms; (B) an organopolysiloxane having hydroxyl groups at both terminals of the molecular chain; (C) an organohydrogenpolysiloxane having in one molecule at least two hydrogen atoms bonded to silicon atoms (SiH groups); and (D) a platinum group metal compound.

The respective components used to make up the silicone rubber composition of the present invention will be described.

(A) Alkenyl Group-containing Organopolysiloxane

The component (A) organopolysiloxane having in one molecule at least two alkenyl groups bonded to silicon atoms is a known organopolysiloxane usually used as a base polymer for addition-curable silicone rubber compositions. This organopolysiloxane has a viscosity of from 100 to 1,000,000 cP (centipoise) at 25° C., and is a compound represented by the general compositional formula (I):

$$R_a SiO_{(4-a)/2}$$

wherein R's each represent a substituted or unsubstituted monovalent hydrocarbon group bonded to a silicon atom, and a represents a number of from 1.9 to 2.4, and preferably from 1.95 to 2.05.

In the general compositional formula (I), as examples of the substituted or unsubstituted monovalent hydrocarbon group represented by R, it may include alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group and a dodecyl group; cycloalkyl groups such as a cyclopentyl group, a cyclohexyl group and a cycloheptyl group; alkenyl groups such as a vinyl group, an allyl group, a propenyl group, an isopropenyl group, a butenyl group, an isobutenyl group, a hexenyl group, a cyclohexenyl group and a cycloheptenyl group; aryl groups such s a phenyl group, a tolyl group, a xylyl group, a naphthyl group and a biphenylyl group; aralkyl groups such as a benzyl group, a phenylethyl group, a phenylpropyl group and a methylbenzyl group; and halogen-substituted or cyano-substituted hydrocarbon groups such as a chloromethyl group, a 2-bromoethyl group, 3-chloropropyl group, a 3,3,3-trifluoropropyl group, a chlorophenyl group, a fluorophenyl group, a cyanoethyl group and a 3,3,4,4,5,5,6,6,6-nonafluorohexyl group. These substituted or unsubstituted monovalent hydrocarbon groups R's may preferably be those having 1 to 12 carbon atoms, and particularly 1 to 8 carbon atoms, and may be the same or different, provided that at least two alkenyl groups must be present in one molecule. These alkenyl groups may be those bonded to any of the silicon atom present at one molecular-chain terminal and a silicon atom present along the molecular chain, or may be those bonded to the both. They may preferably be alkenyl groups bonded at least to the silicon atoms present at both terminals of the molecular chain.

Among the alkenyl groups exemplified above, a vinyl group is preferred. Also, among monovalent hydrocarbon groups R's other than the alkenyl groups, a methyl group, a phenyl group and a 3,3,3-trifluoropropyl group are preferred.

This organopolysiloxane may be of a straight chain, or a branched chain containing an $RSiO_{3/2}$ unit [R is as defined in the general compositional formula (I)] or an $SiO_{4/2}$ unit.

Usually, it may preferably be a straight-chain diorganopolysiloxane terminated with triorganosiloxyl groups at both molecular chain terminals and having a molecular backbone chain consisting basically of the repetition of diorganosiloxane units (i.e., $R_2SiO_{2/2}$ units).

The component (A) organopolysiloxane can be produced by known processes. For example, it can be obtained by subjecting an organocyclopolysiloxane and a hexaorganodisiloxane to equilibration reaction in the presence of an acid catalyst.

As examples of the component (A), it may include

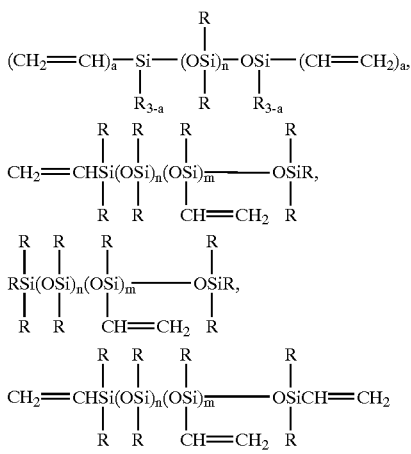

In the above formulas, R's are the same as the groups other than the alkenyl group represented by R in the general compositional formula (I); m is an integer of 1 or more, usually from 1 to 200, and preferably from 2 to 100; n is an integer of 0 or more, usually from 10 to 3,000, and preferably from 50 to 1,500; and a is 1, 2 or 3, and preferably 1.

The alkenyl group-containing organopolysiloxane as described above may be used alone or in combination of two or more types.

(B) Both-terminal Hydroxyl-group-containing Organopolysiloxane

The component (B) organopolysiloxane having hydroxyl groups bonded to silicon atoms (i.e., silanol groups) at both terminals of the molecular-chain is commonly a diorganopolysiloxane having basically a straight-chain structure whose molecular chain is terminated with a diorganohydroxysiloxyl group at both terminals and whose backbone chain consists basically of the repetition of a diorganosiloxane unit, i.e., $R^1_2SiO_{2/2}$ unit where $R^1$ is as defined below. This compound may also have a branched-chain structure such as a monooroganosiloxane unit (trifunctional siloxane unit) or an $SiO_2$ unit at some small part in the molecular chain. This component (B) has a viscosity of from 10 to 1,000,000 cP (centipoise), preferably 15 to 1,000,000 cP at 25° C., and is a component that contributes to an improvement in toner releasability and mechanical strength of cured silicone rubber. Such an organopolysiloxane may preferably be a straight-chain diorganopolysiloxane represented by the general formula (II):

$$HO\text{—}[SiR^1_2O]_n\text{—}H \quad (II)$$

wherein $R^1$'s each represents a substituted or unsubstituted monovalent hydrocarbon group having 1 to 10 carbon atoms, and preferably a monovalent hydrocarbon group having 1 to 8 carbon atoms; and n (the number corresponding to the degree of polymerization) is an integer of two or more, usually form 4 to 3,000, and preferably from 10 to 2,000.

As examples of the monovalent hydrocarbon group represented by $R^1$ in the general formula (II), it may include the same groups as those for the monovalent hydrocarbon group represented by R in the general compositional formula (I), and preferably a methyl group, a phenyl group, a vinyl group and a 3,3,3-trifluoropropyl group.

The component (B) may be used alone or in combination of two or more types.

The component (B) may be mixed in an amount of from 1 to 30 parts by weight, and preferably from 1 to 20 parts by weight, based on 100 parts by weight of the component (A). If it is less than 1 part by weight, the toner releasability of cured silicone rubber may be damaged, and if it is more than 30 parts by weight, the mechanical strength of cured silicone rubber may be damaged.

(C) Organohydrogenpolysiloxane

The component (C) organohydrogenpolysiloxane is a component that acts as a cross-linking agent in the addition (hydrosilylation) reaction of the alkenyl groups in the component (A) alkenyl group-containing organopolysiloxane with the hydrogen atoms bonded to silicon atoms (SiH groups) in the component (C). As this organohydrogenpolysiloxane, there are no particular limitations on its molecular structure. Those of various types as exemplified by linear, cyclic, branched and three-dimensional network structures may be used, which are conventionally manufactured, provided that it must have at least two, and preferably at least three, hydrogen atoms bonded to silicon atoms, i.e., SiH groups, in one molecule. Groups bonded to silicon atoms, other than the SiH groups, are the same substituted or unsubstituted monovalent hydrocarbon groups as the monovalent hydrocarbon group represented by R in the general compositional formula (I). Those not containing any aliphatic unsaturated bonds such as alkenyl groups are preferred. In particular, a methyl group and a phenyl group are preferred.

As the organohydrogenpolysiloxane of the component (C), the compounds represented by the general compositional formula (III) are preferably used:

$$R^2_bH_cSiO_{(4-b-c)/2} \quad (III)$$

wherein $R^2$ stands for an unsubstituted or halogen-substituted monovalent hydrocarbon group preferably having 1 to 10 carbon atoms free of aliphatic unsaturation, b is a number of 0.7 to 2.1, preferably 1.0 to 2.0, and c is a number of 0.002 to 1.0, preferably 0.01 to 1.0, provided that b+c amounts a number in the range of 0.8 to 3.0, preferably 1.0 to 2.7.

The group $R^2$ in the general compositional formula (III) includes, for example, the unsubstituted or halogen-substituted monovalent hydrocarbon groups among those exemplified in respect of R in the general formula (I), except for the unsubstituted or substituted alkenyl groups. Preferred $R^2$ includes alkyl groups such as a methyl group, aryl groups such as a phenyl group, and halogen-substituted alkyl groups such as a 3,3,3-trifluoropropyl group.

There is no limitation on the molecular weight or degree of polymerization of the component (C) organohydrogenpolysiloxane; however, it is preferably liquid at ambient temperature (25° C.), and it more preferably has a viscosity at 25° C. of about 0.1 to 5,000 cP, particularly about 0.5 to 1,000 cP.

The component (C) may be mixed in such an amount that the SiH groups in the component (C) are present in an amount within the range of from 0.4 to 5.0 equivalent weight (i.e., from 0.4 to 5.0 groups), and preferably from 0.8 to 2.0 equivalent weight, per one alkenyl group contained in the component (A). If it is less than 0.4 equivalent weight, the composition may have so excessively a low cross-link density as to adversely affect the heat resistance of cured silicone rubber. Also, if it is more than 5.0 equivalent weight, a problem of foaming due to dehydration reaction may occur, also likewise adversely affecting the heat resistance.

The component (C) organohydrogenpolysiloxane can be produced by known processes. For example, as a production process most commonly used, it can readily be obtained by subjecting octamethylcyclotetrasiloxane and/or tetramethylcyclotetrasiloxane and also a compound containing hexamethyldisiloxane unit or 1,1'-dihydro-2,2',3,3'-tetramethyldisiloxane unit that makes up a terminal group, to equilibration reaction in the presence of an acid catalyst such as sulfuric acid, trifluoromethanesulfonic acid or methanesulfonic acid at a temperature of from about −10° C. to about +40° C. The component (C) thus obtained may be used alone or in combination of two or more types.

The component (C) organohydrogenpolysiloxane may specifically include, e.g., siloxane oligomers such as 1,1,3,3-tetramethyldisiloxane, 1,3,5,7-tetramethylcyclotetrasiloxane and 1,3,5,7,8-pentamethylcyclopentasiloxane; siloxane polymers such as methylhydrogenpolysiloxanes terminated with trimethylsiloxyl groups at both terminals of the molecular chain, dimethylsiloxane-methylhydrogensiloxane copolymers terminated with trimethylsiloxyl groups at both terminals of the molecular chain, methylhydrogenpolysiloxanes terminated with silanol groups at both terminals of the molecular chain, dimethylsiloxane-methylhydrogensiloxane copolymers terminated with silanol groups at both terminals of the molecular chain, dimethylpolysiloxanes terminated with dimethylhydrogensiloxyl groups at both terminals of the molecular chain, methylhydrogenpolysiloxanes terminated with dimethylhydrogensiloxyl groups at both terminals of the molecular chain, and dimethylsiloxane-methylhydrogensiloxane copolymers terminated with dimethylhydrogensiloxyl groups at both terminals of the molecular chain; and silicone resins which consist of an $R^2_2(H)SiO_{1/2}$ unit and an $SiO_{4/2}$ unit and may optionally contain an $R^2_3SiO_{1/2}$ unit, an $R^2_2HSiO_{2/2}$ unit, an $R^2(H)SiO_{2/2}$ unit, an $(H)SiO_{3/2}$ unit or an $R^2SiO_{3/2}$ unit (in the formulas, $R^2$'s are the same as those represented by $R^2$'s in the general compositional formula (III)).

(D) Platinum Group Metal Catalyst

The component (D) platinum group metal catalyst is used as a catalyst that accelerates the curing caused by the addition reaction (hydrosilylation reaction) of the component (A) with the component (C). This platinum group metal catalyst may be any known catalyst, as exemplified by platinum catalysts such as platinum black, chloroplatinic acid, alcohol-modified products of chloroplatinic acid, and complexes of chloroplatinic acid with olefins, aldehydes, vinylsiloxanes or acetylene alcohols; palladium catalysts such as tetrakis(triphenylphosphine)palladium; and rhodium catalysts such as rhodium-olefin complexes and chlorotris(triphenylphosphine)rhodium. It may be added in what is called a catalytically effective quantity, which may appropriately be made large or small in accordance with the desired curing rate. Stated specifically, it may usually be in an amount ranging from 0.1 to 1,000 ppm, and preferably from 1 to 200 ppm, in terms of platinum group metal based on the weight of the component (A).

Other Optional Components

To the silicone rubber composition described above, a reinforcing filler, a retarder and so forth may be added as optional components within amounts that do not impair the effects of the present invention.

The reinforcing filler is a component that further imparts physical and mechanical strength to cured silicone rubber, and may be any of those used usually in conventional silicone rubber compositions, including silica inorganic fillers, e.g., crystalline silica (i.e., quartz powder) and reinforcing silica such as fumed silica and precipitated silica (hydrophilic silica, and hydrophobic silica obtained by hydrophobic-treating the hydrophilic silica). Any of these may be used alone or in combination of two or more types. Commercially available products of the crystalline silica may include CRYSTALITE (available from K.K. Tatsumori); and MINUSIL, IMISIL (available from Illinois Mineral Co.). Commercially available products of the hydrophilic silica may include AEROSIL 130, 200, 300 (available from Nippon Aerosil Co., Ltd. or Degussa Japan Co., Ltd.); CABOSIL MS-5, MS-7, (available from Cabot Corp.); RHEOROSIL QS-102, QS-103 (available from Tokuyama Soda Co., Ltd.); and NIPSIL LP (available from Nippon Silica Industrial Co., Ltd.). Commercially available products of the hydrophobic silica may include AEROSIL R-812, R-812S, R-972, R-974 (available from Degussa Japan Co., Ltd.); RHEOROSIL MT-10 (available from Tokuyama Soda Co., Ltd.); and NIPSIL SS series (available from Nippon Silica Industrial Co., Ltd.). The reinforcing filler is preferably compounded in an amount of 0 to 300 parts by weight, preferably about 5 to 300 parts by weight, more preferably about 20 to 200 parts by weight per 100 parts by weight of the component (A).

The retarder makes control of curing time in order to put the above components (A) to (D) into practical use. It may include, e.g., vinyl group-containing organopolysiloxanes such as vinylcyclotetrasiloxane; triallylisocyanurate, alkyl maleates, acetylene alcohols and silane- or siloxane-modified products thereof, hydroperoxide, tetramethylethylenediamine, benzotriazole, and mixtures of these.

In addition to the foregoing, a non-reinforcing filler such as diatomaceous earth or calcium carbonate, a colorant such as an inorganic pigment (such as cobalt blue) or an organic dye, and a thermal resistance/flame retardance improver such as cerium oxide, zinc carbonate, manganese carbonate, titanium oxide, carbon black or iron oxide may be added as long as the effect of the present invention is not damaged.

Fixing Roller

The fixing roller of the present invention is basically constituted of a mandrel and provided on the outer periphery thereof a silicone rubber layer comprising a cured product of the liquid addition-curable silicone rubber composition described above. It may also embrace a fixing roller wherein, in order to improve the durability of the silicone rubber layer, a coating layer(s) of fluorine resin and/or fluorine rubber is/are further provided on the silicone rubber layer.

The fixing roller can be produced by coating the composition on a mandrel, followed by heat-curing to form the silicone rubber layer, and further optionally coating thereon a fluorine resin melted by heat, and/or coating a fluorine rubber followed by baking, to form the coating layer(s) of fluorine resin and/or fluorine rubber. It can also be produced by setting a mandrel and a fluorine resin tube in a mold and injecting the silicone rubber composition to the space between the mandrel and the fluorine resin tube, followed by heat-curing to form a silicone rubber layer covered with the fluorine resin tube.

As materials for the mandrel, any of iron, aluminum and stainless steel may be used. A mandrel subjected to primer treatment on its outer periphery may also be used.

The fluorine resin or fluorine resin tube may include, e.g., polytetrafluoroethylene (PTFE), a tetrafluoroethylene/hexafluoropropylene copolymer (FEP), tetrafluoroethylene/perfluoroalkyl vinyl ether copolymers (PFA), polychlorotrifluoroethylene (PCTFE), polyvinylidene fluoride, polyvinyl fluoride, and an ethylene/chlorotrifluoroethylene copolymer (ECTFE), or tubes of these. The fluorine rubber may include, e.g., vinylidene fluoride type fluorine rubbers, propylene/tetrafluoroethylene type fluorine rubbers, tetrafluoroethylene/perfluoroalkyl vinyl ether type fluorine rubbers, thermoplastic fluorine rubbers and fluorosilicone rubbers. These are available in the form of heat-shrinkable tubings, films, water-based coating materials, organic-solvent coating materials, powder coating materials and so forth.

EXAMPLES

The present invention will now be described below in greater detail with reference to Examples. The present invention is by no means limited to these. In the following, viscosity is expressed as viscosity at 25° C.

Example 1

100 parts by weight of dimethylpolysiloxane with a viscosity of 100,000 cP, terminated with dimethylvinylsilyl groups at both terminals of the molecular chain, 28 parts by weight of α,ω-dihydroxydimethylpolysiloxane with a viscosity of 50,000 cP, 20 parts by weight of crystalline silica with an average particle diameter of 1.5 μm and 2 parts by weight of iron oxide 130ED (trade name; available from Toda Kogyo Corporation) with an average particle diameter of 0.16 μm were uniformly mixed. To the mixture obtained, 3 parts by weight of methylhydrogenpolysiloxane with a viscosity of about 10 cP, represented by the following formula (1):

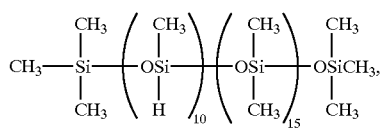

4 parts by weight of methylvinylpolysiloxane with a viscosity of 1,000 cP, containing 5 mole % of vinyl groups [—Si(CH=CH$_2$) (CH$_3$)O— units] bonded to silicon atoms present along the molecular chain, 0.1 part by weight of a retarder 1-ethynyl-1-cyclohexanol and 50 ppm as platinum atoms, of a platinum-vinylsiloxane complex were further added, and these were mixed well to make up a uniform mixture. This was designated as liquid composition 1

Example 2

100 parts by weight of a straight-chain dimethylpolysiloxane terminated with trimethylsiloxyl groups at both terminals of the molecular chain and containing about 10 pendent vinyl groups in the form of methylvinylsiloxane units on the average (degree of polymerization: about 400), 1 part by weight of α,ω-dihydroxydimethylpolysiloxane with a viscosity of 1,000,000 cP, 20 parts by weight of crystalline silica with an average particle diameter of 5 μm and 2 parts by weight of iron oxide 130ED (trade name; available from Toda Kogyo Corporation) with an average particle diameter of 0.16 μm were uniformly mixed. To the mixture obtained, 3 parts by weight of methylhydrogenpolysiloxane with a viscosity of about 10 cP, represented by the following formula (2):

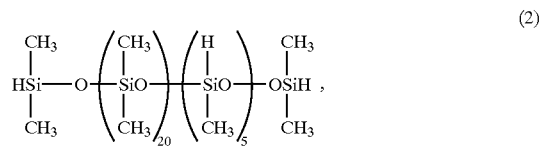

4 parts by weight of methylvinylpolysiloxane with a viscosity of 1,000 cP, containing 5 mole % of vinyl groups [—Si(CH=CH$_2$) (CH$_3$)O— units] bonded to silicon atoms present along the molecular chain, 0.1 part by weight of a retarder 1-ethynyl-1-cyclohexanol and 50 ppm as platinum atoms, of a platinum-vinylsiloxane complex were further added, and these were mixed well to make up a uniform mixture. This was designated as liquid composition 2.

Example 3

100 parts by weight of dimethylpolysiloxane with a viscosity of 100,000 cP, terminated with dimethylvinylsilyl groups at both terminals of the molecular chain, 27 parts by weight of α,ω-dihydroxydimethylpolysiloxane with a viscosity of about 15 cP, represented by the following formula (3):

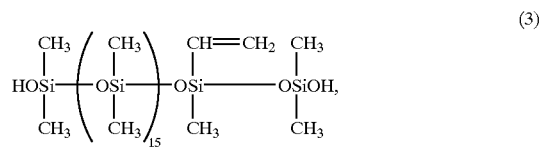

20 parts by weight of crystalline silica with an average particle diameter of 1.5 μm and 2 parts by weight of iron oxide 130ED (trade name; available from Toda Kogyo Corporation) with an average particle diameter of 0.16 μm were uniformly mixed. To the mixture obtained, 3 parts by weight of methylhydrogenpolysiloxane with a viscosity of about 10 cP, represented by the following formula (4):

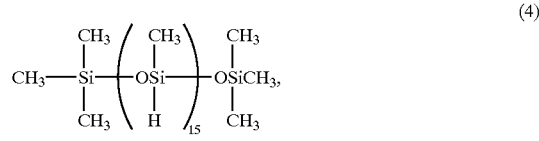

4 parts by weight of methylvinylpolysiloxane with a viscosity of 1,000 cP, containing 5 mole % of vinyl groups [—Si(CH=CH$_2$) (CH$_3$)O— units] bonded to silicon atoms present along the molecular chain, 0.1 part by weight of a retarder 1-ethynyl-1-cyclohexanol and 50 ppm as platinum atoms, of a platinum-vinylsiloxane complex were further added, and these were mixed well to make up a uniform mixture. This was designated as liquid composition 3.

Comparative Example 1

Liquid composition 4 was obtained in the same manner as in Example 1 except that 28 parts by weight of the α,ω- dihydroxydimethylpolysiloxane with a viscosity of 5,000 cP was changed to 33 parts by weight of the same.

Comparative Example 2

Liquid composition 5 was obtained in the same manner as in Example 2 except that 1 part by weight of the α,ω-dihydroxydimethylpolysiloxane with a viscosity of 1,000,000 cP was changed to 0.8 part by weight of the same.

Comparative Example 3

Liquid composition 6 was obtained in the same manner as in Example 3 except that 27 part by weight of the dihydroxydimethylpolysiloxane of the formula (3) was changed to 31 parts by weight of the same.

Example 4

A primer for liquid addition-curable silicone rubber composition, No.101A/B (trade name; available from Shin-Etsu Chemical Co., Ltd.), was coated on the outer periphery of an aluminum shaft of 14 mm diameter and 250 mm long as a mandrel to make primer treatment. The liquid composition 1, obtained in Example 1, was coated thereon, followed by pre-curing at 150° C. for 30 minutes and further followed by post-curing at 200° C. for 4 hours to form a silicone rubber layer of 2 mm thick, thus a silicone rubber roller was produced which was 18 mm external diameter and 200 mm long.

Next, this silicone rubber roller was set as a fixing roller of a PPC copying machine, and copies were taken on 100,000 sheets. As a result, good copies free of any uneven fixing were obtainable.

Comparative Example 4

A silicone rubber roller of 18 mm external diameter and 200 mm long was produced in the same manner as in Example 4 except that the liquid composition 1 was replaced with the liquid composition 4, obtained in Comparative Example 1.

Next, this silicone rubber roller was set as a fixing roller of a PPC copying machine, and copies were taken. As a result, copies with uneven fixing were obtained on 40,000 sheet copying.

Example 5

The same primer for liquid addition-curable silicone rubber composition, No.101A/B (trade name; available from Shin-Etsu Chemical Co., Ltd.), as that used in Example 4 was coated on the outer periphery of an aluminum shaft of 14 mm diameter and 300 mm long as a mandrel to make primer treatment. The liquid composition 2, obtained in Example 2, was coated thereon, followed by pre-curing at 150° C. for 30 minutes and further followed by post-curing at 200° C. for 4 hours to form a silicone rubber layer of 2 mm thick, thus a silicone rubber roller was produced which was 18 mm external diameter and 250 mm long.

Next, this silicone rubber roller was set as a fixing roller of a PPC copying machine, and copies were taken on 100,000 sheets. As a result, good copies free of any uneven fixing were obtainable.

Comparative Example 5

A silicone rubber roller of 18 mm external diameter and 250 mm long was produced in the same manner as in Example 5 except that the liquid composition 2 was replaced with the liquid composition 5, obtained in Comparative Example 2.

Next, this silicone rubber roller was set as a fixing roller of a PPC copying machine, and copies were taken. As a result, copies with uneven fixing were obtained on 30,000 sheet copying.

Example 6

The same primer for liquid addition-curable silicone rubber composition, No.101A/B (trade name; available from Shin-Etsu Chemical Co., Ltd.), as that used in Example 4 was coated on the outer periphery of an aluminum shaft of 14 mm diameter and 250 mm long as a mandrel to make primer treatment. The liquid composition 3, obtained in Example 3, was coated thereon, followed by pre-curing at 150° C. for 30 minutes and further followed by post-curing at 200° C. for 4 hours to form a silicone rubber layer of 2 mm thick, thus a silicone rubber roller was produced which was 18 mm external diameter and 200 mm long.

Next, this silicone rubber roller was set as a fixing roller of a PPC copying machine, and copies were taken on 100,000 sheets. As a result, good copies free of any uneven fixing were obtainable.

Comparative Example 6

A silicone rubber roller of 18 mm external diameter and 200 mm long was produced in the same manner as in Example 6 except that the liquid composition 3 was replaced with the liquid composition 6, obtained in Comparative Example 3.

Next, this silicone rubber roller was set as a fixing roller of a PPC copying machine, and copies were taken. As a result, copies with uneven fixing were obtained on 10,000 sheet copying.

As described above, the fixing roller purpose liquid addition-curable silicone rubber composition of the present invention has a good moldability to a mandrel and enables production of a fixing roller having a silicone rubber layer having superior toner releasability and mechanical strength. Hence, the fixing roller produced using this silicone rubber composition enables mass formation of good copied images free of any uneven fixing.

What is claimed is:

1. A fixing roller comprising a mandrel and an outermost silicone rubber layer formed of a cured product of an addition-curable liquid silicone rubber composition provided on the outer periphery of said mandrel, said composition comprising:

(A) 100 parts by weight of an organopolysiloxane having in one molecule at least two alkenyl groups bonded to silicon atoms;

(B) from 1 part by weight to 30 parts by weight of an organopolysiloxane having hydroxyl groups at both terminals of the molecular chain represented by the formula (II):

$$HO-[SiR^1{}_2O]_n-H \qquad (II)$$

wherein each $R^1$ represents a substituted or unsubstituted monovalent hydrocarbon group having 1 to 10 carbon atoms, and n is an integer of 18 to 3,000;

(C) an organohydrogenpolysiloxane having in one molecule at least two hydrogen atoms bonded to silicon atoms; the hydrogen atoms bonded to silicon atoms in the component (C) being present in an amount of from 0.4 to 5.0 equivalent weight per one alkenyl group in the component (A);

(D) a platinum group metal compound in a catalytically effective quantity; and (E) a silica inorganic filler.

2. The roller according to claim 1, wherein the organopolysiloxane of the component (A) has a viscosity at 25° C. of 100 to 1,000,000 cP.

3. The roller according to claim 1, wherein the organopolysiloxane of the component (A) is represented by the general compositional formula (I):

$$R_aSiO_{(4-a)/2} \tag{I}$$

wherein R's each represent a substituted or unsubstituted monovalent hydrocarbon group bonded to a silicon atom, and a represents a number of from 1.9 to 2.4.

4. The roller according to claim 3, wherein the substituted or unsubstituted monovalent hydrocarbon group represented by the R's has 1 to 12 carbon atoms.

5. The roller according to claim 3, wherein R's are each an alkyl group, a cycloalkyl group, an alkenyl group, a cycloalkenyl group, an aryl group, an aralkyl group, or a corresponding hydrocarbon group substituted by a halogen atom or a cyano group.

6. The roller according to claim 1, wherein the organopolysiloxane of the component (A) is in a substantially straight chain structure and has silicon-bonded alkenyl groups at least at the both terminal ends of the molecular chain.

7. The roller according to claim 1, wherein said alkenyl groups in the organopolysiloxane of the component (A) are vinyl groups and other organic groups present therein are a methyl group, a phenyl group or a 3,3,3-trifluoropropyl group.

8. The roller according to claim 1, wherein said organopolysiloxane of the component (A) is represented by at least one formula of the formulas:

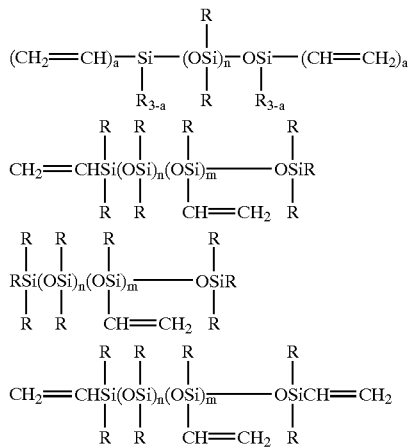

wherein in the above formulas, each R represents a substituted or unsubstituted hydrocarbon group; m is an integer of 1 or more; n is an integer of 0 or more; and a is 1, 2 or 3.

9. The roller according to claim 1, wherein said hydroxyl-terminated organopolysiloxane of the component (B) is a diorganopolysiloxane having basically a straight-chain structure whose molecular chain is terminated with a diorganohydroxysiloxyl group at both terminals and whose backbone chain consists basically of the repetition of a diorganosiloxane unit.

10. The roller according to claim 1, wherein said hydroxyl-terminated organopolysiloxane of the component (B) has a viscosity of from 10 to 1,000,000 cP at 25° C.

11. The roller according to claim 1, wherein said hydroxyl-terminated organopolysiloxane of the component (B) is a straight-chain diorganopolysiloxane represented by the general formula (II):

$$HO-[SiR^1_2O]_n-H \tag{II}$$

wherein $R^1$'s each represent a substituted or unsubstituted monovalent hydrocarbon group having 1 to 10 carbon atoms, and n is an integer of two or more.

12. The roller according to claim 11, wherein said monovalent hydrocarbon groups represented by $R^1$'s are each a methyl group, a phenyl group, a vinyl group or a 3,3,3-trifluoropropyl group.

13. The roller according to claim 1, wherein the organohydrogenpolysiloxane of said component-(C) has at least three hydrogen atoms bonded to silicon atoms.

14. The roller according to claim 1, wherein in the organohydrogenpolysiloxane of said component-(C) the groups bonded to silicon atoms, other than the SiR groups, are the same substituted or unsubstituted monovalent hydrocarbon groups as the monovalent hydrocarbon group represented by R in the general compositional formula (I), except for groups containing any aliphatic unsaturated.

15. The roller according to claim 14, wherein the groups bonded to silicon atoms, other than the SiH groups, are independently a methyl group, a phenyl group or a 3,3,3-trifluoropropyl group.

16. The roller according to claim 1, wherein the component (B) is present in an amount of 1 to 20 pats by weight per 100 parts by weight of the component (A), the component (C) is present in an amount of 0.8 to 2.0 equivalent weight per one alkenyl group in the component (A), and the component (D) is present in an amount of from 0.1 to 1,000 ppm in terms of platinum group metal based on the weight of the component (A).

* * * * *